Patented Sept. 5, 1922.

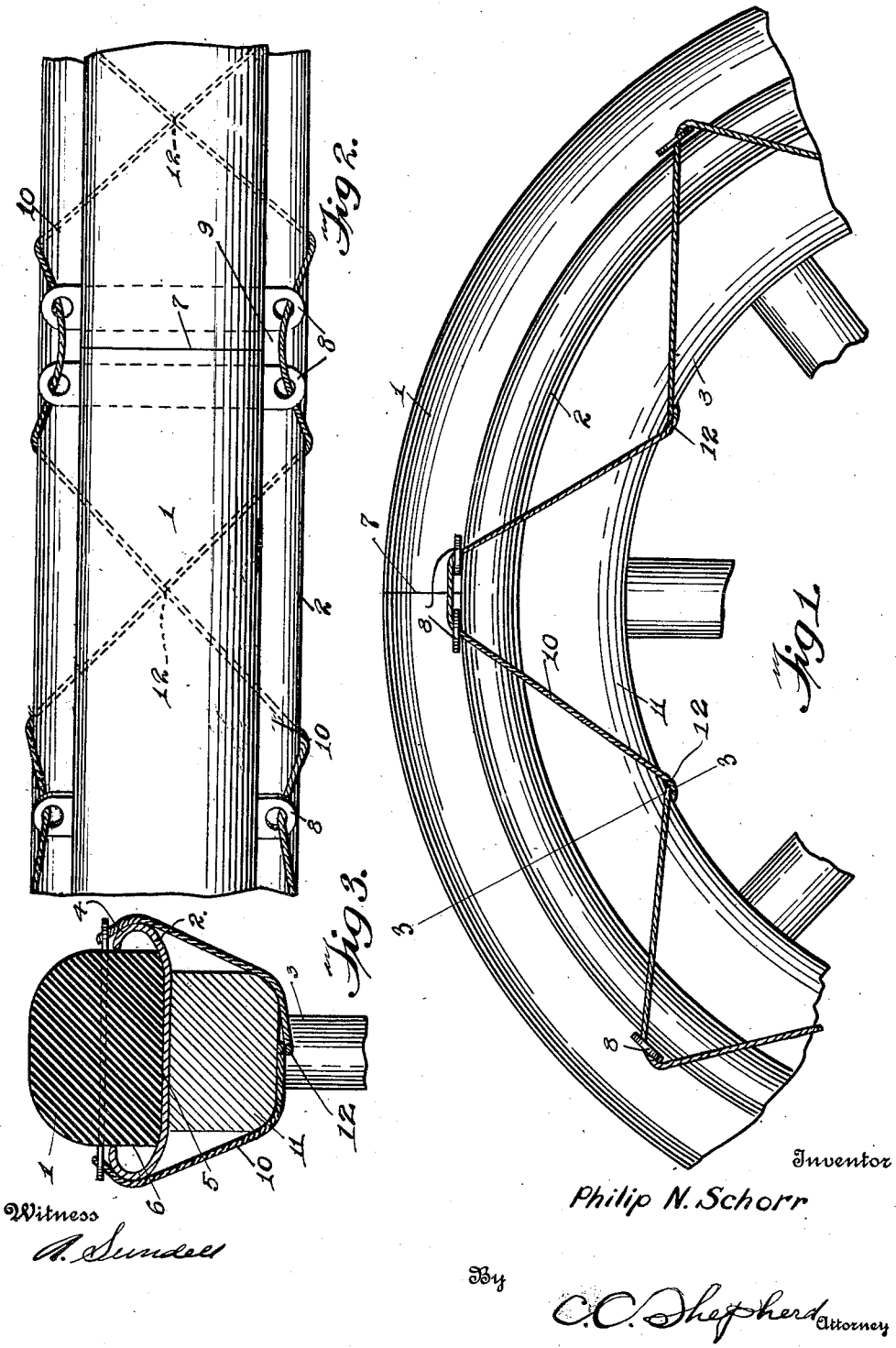

1,428,452

UNITED STATES PATENT OFFICE.

PHILIP N. SCHORR, OF LANCASTER, OHIO.

EMERGENCY TIRE.

Application filed August 27, 1919. Serial No. 320,206.

*To all whom it may concern:*

Be it known that PHILIP N. SCHORR, a citizen of the United States, residing at Lancaster, in the county of Fairfield and State of Ohio, has invented certain new and useful Improvements in Emergency Tires, of which the following is a specification.

This invention relates to automobile tires and has for its general object to provide an improved emergency tire adapted for the purpose of replacing an ordinary pneumatic tire after the latter has been injured, whereby the vehicle so equipped may continue its journey without injury to the wheel structure thereof until it is convenient to make appropriate repairs or substitutions with regard to the pneumatic tire.

Another object of the invention resides in an emergency tire which is adapted to seat within the rim of a motor vehicle and in the provision of novel and effective means for retaining the tire within and upon said rim, said means consisting of a plurality of flat bars which are arranged to project through the tire above said rim, said bars being apertured and disposed to project beyond the adjacent edges of the rim, and to provide a lacing which passes through the apertures of said bars and is arranged to be trained around the rim and felly structure of the wheel so that the emergency tire may be drawn into and held in firm engagement with said rim in a quick, effective and positive manner.

For a further understanding of the invention, reference is to be had to the following description and to the accompanying drawing, in which:

Figure 1 is a fragmentary side elevation of a motor vehicle wheel equipped with the emergency tire comprising the present invention.

Figure 2 is a top plan view thereof, and,

Figure 3 is a transverse vertical sectional view taken along the line 3—3 of Figure 1.

Referring more particularly to the details of the invention, as the latter are set forth in the form disclosed in the drawing, it will be apparent that my improved emergency tire is in the form of a solid rubber or rubberized strip, which is indicated by the numeral 1. This strip is adapted, as shown in Figure 3, to be positioned within the rim 2 of a motor vehicle wheel 3. The rim may be of any standard form, but in this instance it has been shown as formed with the usual clinching beads 4, which are adapted to receive the rim projections of a pneumatic tire, not shown. In the event of injury to the penumatic tire, the latter is removed from the rim 2 and the emergency tire 1 is substituted in lieu thereof, so that the vehicle may proceed without injury to the wheel structure until suitable repairs may be performed. The strip 1 is provided with a substantially flat base portion 5, which is arranged to engage with a similarly shaped portion of the rim, and the vertical walls 6 of the tire 1 are so disposed as to lie immediately within and in engagement with the outer edges of the beads 4, so that said beads will impinge against the sides of the tire 1 and in this manner will serve to retain the same in its seated position upon said rim.

In order to unite the joint 7 of the tire 1 so that the latter will be drawn tautly around the periphery of the rim, and also to securely bind the tire to said rim, I preferably form the tire 1 with a plurality of transversely extending flat metallic bars 8, which are arranged to pass transversely through said tire at positions immediately beyond the rim 2, said bars being provided with projecting ends which are slightly spaced from the beads 4, and these projecting ends are apertured as at 9. The bars 8 are so arranged that a pair of the same will lie immediately adjacent to the ends of the strip 1, so that when the tire is assembled upon the rim, the end bars will lie in contiguous relationship, as shown in Figure 1. The remaining bars may be suitably spaced circumferentially around the tire and are located to assume the same relative positions as the bars which are positioned adjacent to the joint 7. Flexible cables 10 are arranged to pass through said apertures and are laced around the felly 11 of the wheel structure in substantially the manner shown, and are crossed as indicated at 12 so that when tensile stress is imparted to the same, the ends of the strip 1 will be drawn together. The cables are preferably arranged so as to alternate successively first from one side of the wheel and then to the other so that by being thus trained a considerable pull may be imparted to the same and the tire 1 thus drawn into firmly bound relation with the rim 2. The ends of the cables may be suitably united so that the stress on the cables as a whole may be maintained.

From the foregoing description, taken in connection with the accompanying drawing, it will be apparent that there is provided an emergency tire structure which is capable of being effectively used as a temporary substitute for the pneumatic tire of motor vehicle wheels. Through the use of the tire 1, a motor vehicle is enabled to successfully proceed even after injury to a tire and without causing injury to the rim structure. Through the provision of the securing mechanism described, the emergency tire may be conveniently and positively connected with the rim structure and will be prevented from slipping or becoming accidentally disengaged therewith. Emergency tires of very simple construction, capable of being economically manufactured will require but slight trouble when effecting the positioning of the same.

I claim:

An emergency tire for motor vehicle wheels, comprising a strip of flexible resilient material arranged to be seated within the rim construction of a vehicle wheel and to project radially beyond the same to provide a yieldable traction surface for said wheel, means for retaining said tire in its position of application upon said wheel, including a plurality of spaced metallic bars arranged to pass transversely through said tire so that the ends thereof will lie outside of the rim of said wheel, and a lacing arranged to pass through apertures formed in the outwardly projecting ends of said bars and to be trained in a crosswise manner around the felly of said wheel, whereby upon the tightening and securing of said lacing the ends of said tire will be drawn together to retain the latter in connection with said wheel.

In testimony whereof I affix my signature.

PHILIP N. SCHORR.